United States Patent
Kostrzewski

(10) Patent No.: US 9,322,326 B2
(45) Date of Patent: Apr. 26, 2016

(54) SYSTEM AND METHOD FOR REDUCING VANE STICKING IN A VARIABLE GEOMETRY TURBOCHARGER

(71) Applicant: Ford Global Technologies, LLC, Dearborn, MI (US)

(72) Inventor: Thomas Jeremy Kostrzewski, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 81 days.

(21) Appl. No.: 14/192,759

(22) Filed: Feb. 27, 2014

(65) Prior Publication Data

US 2015/0240708 A1 Aug. 27, 2015

(51) Int. Cl.
| F02B 37/18 | (2006.01) |
| F02B 37/24 | (2006.01) |
| F02M 25/07 | (2006.01) |
| F02D 41/00 | (2006.01) |
| F02D 41/10 | (2006.01) |
| F02D 41/12 | (2006.01) |
| F02D 41/22 | (2006.01) |
| F02D 11/10 | (2006.01) |
| F02B 29/04 | (2006.01) |

(52) U.S. Cl.
CPC ............ *F02B 37/24* (2013.01); *F02D 41/0007* (2013.01); *F02D 41/0065* (2013.01); *F02D 41/0077* (2013.01); *F02D 41/107* (2013.01); *F02D 41/12* (2013.01); *F02D 41/221* (2013.01); *F02M 25/0707* (2013.01); *F02M 25/0713* (2013.01); F02B 29/0406 (2013.01); F02D 2011/108 (2013.01); F02D 2200/021 (2013.01); F02D 2200/101 (2013.01); F02D 2200/602 (2013.01); *F02M 25/0709* (2013.01); *F02M 25/0727* (2013.01)

(58) Field of Classification Search
CPC ...... F02B 37/24; F02B 37/22; F02B 29/0406; F02D 41/0007; F02D 41/0065; F02D 41/0077; F02D 41/107; F02D 41/12; F02D 41/221; F02D 2011/108; F02D 2200/021; F02D 2200/101; F02D 2200/602; F02M 25/0707; F02M 25/0709; F02M 25/0713; F02M 25/0727
USPC .................. 60/602, 605.2; 701/102–108
See application file for complete search history.

(56) References Cited

U.S. PATENT DOCUMENTS

| 4,292,806 | A | * | 10/1981 | Moore et al. ............. 60/600 |
| 6,155,049 | A | * | 12/2000 | Bischoff ................ 60/602 |
| 6,178,749 | B1 | | 1/2001 | Kolmanovsky et al. |
| 6,418,719 | B2 | | 7/2002 | Terry et al. |
| 6,973,785 | B2 | * | 12/2005 | Umehara et al. ......... 60/605.2 |

(Continued)

*Primary Examiner* — Thai Ba Trieu
*Assistant Examiner* — Brandon Lee
(74) *Attorney, Agent, or Firm* — Julia Voutyras; Alleman Hall McCoy Russell & Tuttle LLP

(57) ABSTRACT

A method for operating an engine system is described herein. The method includes moving a plurality of vanes in a variable geometry turbocharger toward a closed position in response to tip-out and after moving the plurality of vanes toward the closed position, moving an EGR valve from a fully closed position toward an open position in response to tip-in, the EGR valve in fluidic communication with an exhaust subsystem upstream of the turbine. The method further includes, after moving the EGR valve toward an open position, moving the plurality of vanes based on one or more of a driver-requested torque, engine speed, and engine temperature.

20 Claims, 5 Drawing Sheets

(56) References Cited

U.S. PATENT DOCUMENTS

| | | | |
|---|---|---|---|
| 7,076,953 B2 * | 7/2006 | Kreso | .......................... 60/605.2 |
| 7,322,194 B2 | 1/2008 | Sun et al. | |
| 2009/0077968 A1 | 3/2009 | Sun | |
| 2011/0270511 A1 | 11/2011 | Kurtz | |
| 2013/0311068 A1 | 11/2013 | Rollinger et al. | |

* cited by examiner

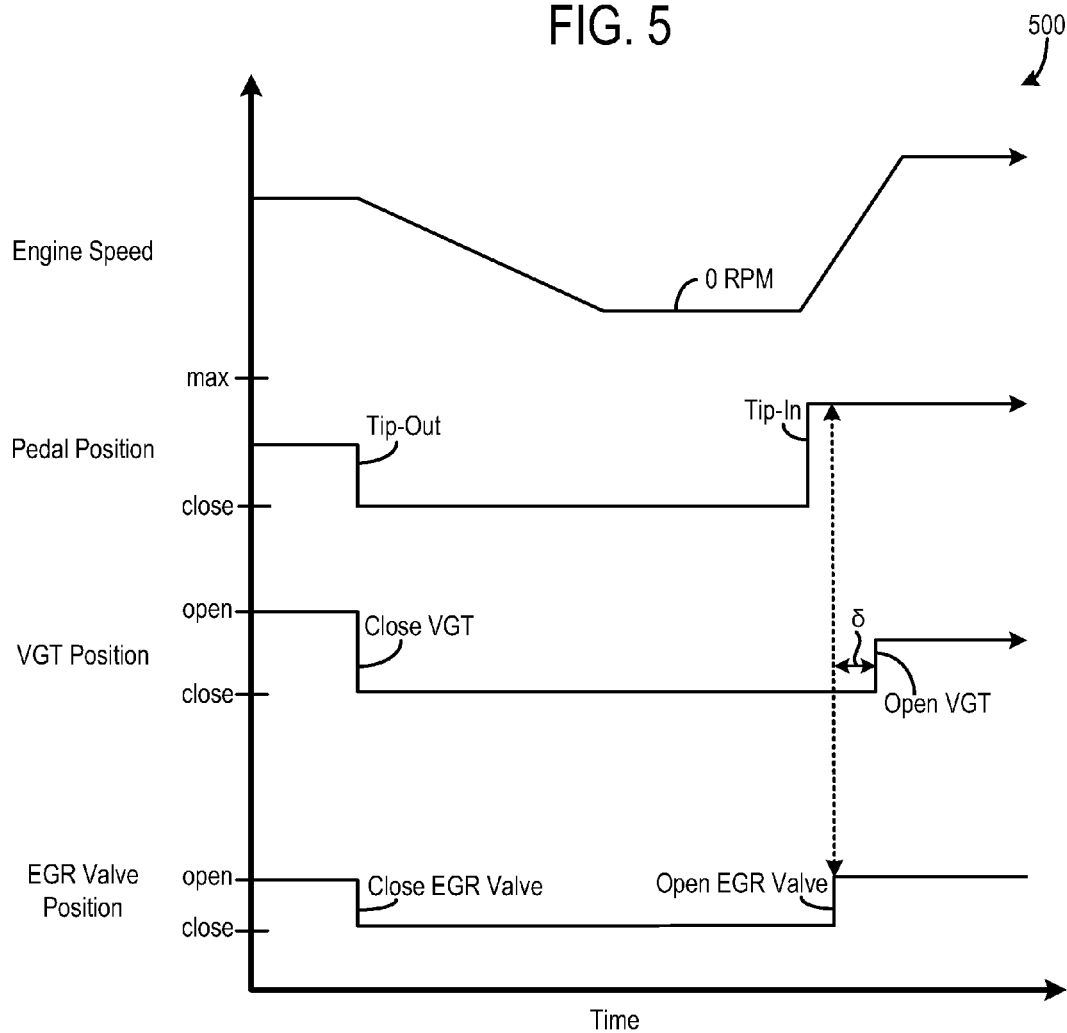

SYSTEM AND METHOD FOR REDUCING VANE STICKING IN A VARIABLE GEOMETRY TURBOCHARGER

FIELD

The present disclosure relates to a system and method for reducing vane sticking in a variable geometry turbocharger.

BACKGROUND AND SUMMARY

Boosted engines may provide a number of benefits, such as decreased emissions and increased fuel efficiency, when compared to naturally aspirated engines having a similar power output. Furthermore, boosted engines may be lighter than naturally aspirated engines having a similar power output. As a result, vehicle efficiency is increased when engines are boosted by devices, such as turbocharger.

However, turbochargers may experience lag during certain operating conditions, such as tip-in, start-up, etc. The lag decreases the power output of the engine and delays throttle response, impacting vehicle performance and decreasing customer satisfaction. Furthermore, fixed vane turbochargers may only be sized to efficiently operate over limited engine speed ranges, thereby decreasing engine operating efficiency. Specifically, some turbochargers may have a threshold speed below which a compressor provide negligible boost to the engine. Therefore, when the engine is operated below the threshold speed engine performance may suffer.

U.S. Pat. No. 6,418,719 discloses a variable geometry turbocharger (VGT) and control system for adjusting the VGT to generate a desired amount of back-pressure in the engine. Specifically, a difference between a desired and measured exhaust back-pressure is used to determine VGT adjustment in the control system described in U.S. Pat. No. 6,418,719.

However, the inventors have recognized several drawbacks with the VGT system disclosed in U.S. Pat. No. 6,418,719. For instance, the vanes in the VGT may become stuck during certain operating conditions, such as engine braking carried out by the VGT. As a result, the likelihood of engine damage may be increased due to increased pressure at the turbine inlet and increased in-cylinder pressure due to control loss of intake manifold pressure. Furthermore, malfunctioning VGT vanes may also lead to undesirable back-pressure generation. As a result, engine performance may be negatively impacted.

The inventors herein have recognized the above issues and developed a method for operating an engine system. The method includes moving a plurality of vanes in a variable geometry turbocharger toward a closed position in response to tip-out and after moving the plurality of vanes toward the closed position, moving an EGR valve from a fully closed position toward an open position in response to tip-in, the EGR valve in fluidic communication with an exhaust subsystem upstream of the turbine. The method further includes, after moving the EGR valve toward the open position, moving the plurality of vanes based on driver-requested torque, engine temperatures, and/or engine speed. In this way, the EGR may be used to reduce pressure at the turbine inlet. As a result, the likelihood of the turbine vanes becoming unstuck is increased, thereby improving engine operation. Additionally, implementation of engine braking also decreases wear on external braking mechanism in the vehicle, such as friction brakes (i.e., disk brakes), thereby increasing the longevity of the braking system in the vehicle. Furthermore, operating the EGR in this way enables the EGR to assume certain wastegate functionalities, thereby enabling a turbine wastegate to be omitted from the turbocharger system, if desired. As a result, the cost of the turbocharger system may be decreased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 5 shows a graph illustrating movement of the accelerator pedal, VGT, and an EGR valve vs. time.

DETAILED DESCRIPTION

A system and method for mitigating turbine vane malfunction in a variable geometry turbocharger is described herein. Specifically, a method is provided where an exhaust gas recirculation (EGR) valve is opened responsive to tip-in initiated after an engine braking event, to relieve aerodynamic load on the turbine. Movement of the vanes from a stuck position to an unstuck position may be enabled via the opening of the EGR valve due to the reduction in turbine inlet pressure. As a result, the likelihood of engine damage caused by undesirable engine back-pressure and in-cylinder pressure is decreased. Furthermore, on-board diagnostic (OBD) error states caused by loss of intake manifold pressure control may also be avoided when the EGR valve is operated in this way. As a result, the engine's longevity as well as customer satisfaction is increased. Furthermore, it will be appreciated that the method may be implemented in a turbocharger system without a wastegate or in a system where the wastegate is not in use or not properly functioning. Consequently, the number of parts in the engine system may be reduced thereby reducing engine cost, if desired.

Figure 1:
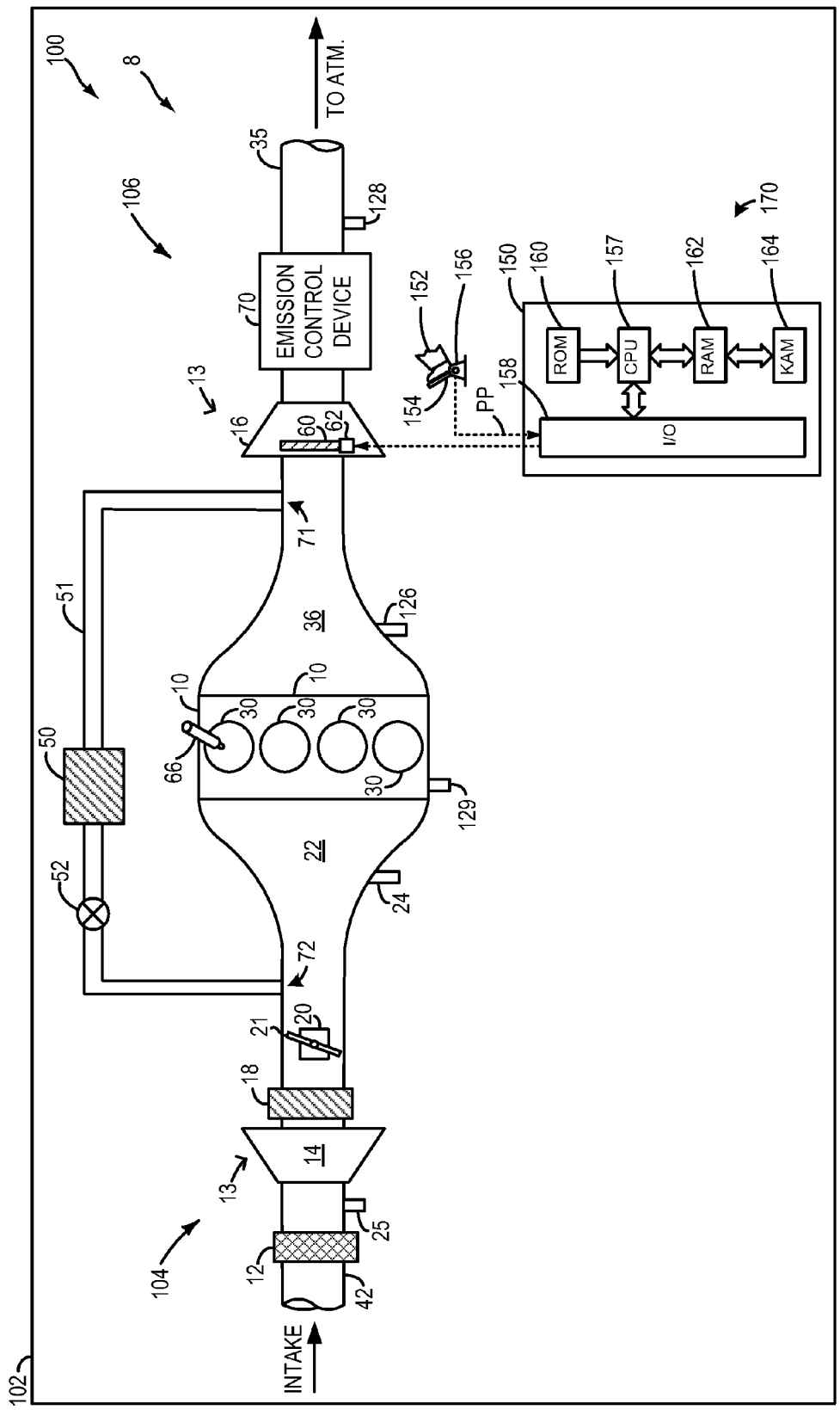
FIG. 1 shows a schematic depiction of a vehicle having an engine and a variable geometry turbocharger.

FIG. 1 schematically shows aspects of an example engine system 100 including an engine 10. The engine system 100 may be included in a vehicle 102. In the depicted example, engine 10 is a boosted engine coupled to a turbocharger 13 including a compressor 14 driven by a turbine 16. The compressor 14 may be mechanically coupled to the turbine 16 via a suitable mechanical component such as a drive shaft. The compressor 14 is configured to increase the pressure of the intake air to provide boost to engine 10. On the other hand, the turbine 16 is configured to receive exhaust gas from the engine and drives the compressor 14. The turbine 16 includes a plurality of vanes 60. The vanes 60 are moveable to alter the aspect ratio of the turbine 16. Thus, the turbine may be referred to as a variable geometry turbine (VGT). Thus, the vanes 60 are moveable to increase or decrease the aspect ratio of the turbine. As a result, the turbocharger may be adjusted based on engine operating conditions (e.g., speed, load, etc.) to decrease engine feed gas emissions and/or increase engine power output. An actuation device 62 is coupled to the plurality of vanes 60. The actuation device 62 is configured to alter the positions of the plurality of vanes 60. The actuation device may be a hydraulic actuator controlled via engine oil pressure solenoid valve, in one example. In another example, the actuation device 62 may be an electronic actuation device. In such an example, the actuation device 62 may be in electronic communication with the controller 150.

Fresh air is introduced along intake passage 42 into engine 10 via filter 12 and flows to compressor 14. The filter 12 may be configured to remove particulates from the intake air. A flow rate of ambient air that enters the intake sub-system through intake passage 42 can be controlled at least in part by adjusting throttle 20. The throttle 20 includes a throttle plate 21. The throttle plate 21 is adjustable to regulate the amount of airflow provided to downstream components (e.g., the cylinders 30). The throttle 20 may be in electronic communication with the controller 150. However in other examples, such as in the case of a compression ignition engine, the throttle may not be included in the engine.

Compressor 14 may be any suitable intake-air compressor. In engine system 10, the compressor is a turbocharger compressor mechanically coupled to turbine 16 via a shaft (not shown), the turbine 16 driven by expanding engine exhaust. In one example, the turbocharger may be a variable geometry turbocharger (VGT), where turbine geometry may be actively varied as a function of engine speed and/or load. As shown, the turbine 16 includes moveable vanes 60 which are adjustable via an actuation device 62, discussed in greater detail herein.

The vehicle 102 includes an intake sub-system 104 including the intake passage 42, the filter 12, the compressor 14, the charge air cooler 18, the throttle 20, and the intake manifold 22. The intake sub-system 104 may further include intake valves (e.g., poppet valves) coupled to the combustion chambers 30. The intake sub-system 104 is in fluidic communication with the engine 10. Specifically, the intake sub-system 104 is configured to provide intake air to the combustion chambers 30.

The vehicle 102 further includes an exhaust sub-system 106. The exhaust sub-system 106 may include the exhaust manifold 36, turbine 16, emission control device 70, and exhaust conduit 35. It will be appreciated that the exhaust system may include additional components such as exhaust valves, conduits, mufflers, etc.

As shown in FIG. 1, compressor 14 is coupled, through charge-air cooler 18 to throttle 20. Throttle 20 is coupled to engine intake manifold 22. From the compressor, the compressed air charge flows through the charge-air cooler and the throttle valve to the intake manifold. The charge-air cooler may be an air-to-air or air-to-water heat exchanger, for example. In the example shown in FIG. 1, the pressure of the air charge within the intake manifold is sensed by manifold air pressure (MAP) sensor 24. The compressor by-pass valve may be a normally closed valve configured to open under selected operating conditions to relieve excess boost pressure. For example, the compressor by-pass valve may be opened during conditions of decreasing engine speed to avert compressor surge. However, in other examples the compressor bypass valve may be omitted from the engine system, if desired.

Intake manifold 22 is coupled to a series of combustion chambers 30 through a series of intake valves (not shown).

The combustion chambers are further coupled to exhaust manifold 36 via a series of exhaust valves (not shown). In the depicted example, a single exhaust manifold 36 is shown. However, in other examples, the exhaust manifold may include a plurality of exhaust manifold sections. Configurations having a plurality of exhaust manifold section may enable effluent from different combustion chambers to be directed to different locations in the engine system.

Combustion chambers 30 may be supplied one or more fuels, such as gasoline, alcohol fuel blends, diesel, biodiesel, compressed natural gas, etc. Therefore it will be appreciated that the engine may utilize any of the aforementioned fuels. Fuel may be supplied to the combustion chambers via fuel injector 66. In the depicted example, fuel injector 66 is configured for direct injection though in other examples, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition. The fuel injector may be in fluidic communication with a fuel tank (not shown) configured to store a fuel. The fuel injector and fuel tank may be included in a fuel delivery system which may additionally include one or more pumps, filter, valves, etc. In the case of a spark ignition engine ignition devices may be coupled to the combustion chambers.

Exhaust from exhaust manifold 36 is directed to turbine 16 to drive the turbine. The flow from the turbine then flows through emission control device 70. In general, one or more emission control devices 70 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some examples, the exhaust after-treatment stages may include a regenerable soot filter configured to trap and oxidize soot particles in the exhaust flow. All or part of the treated exhaust from emission control device 70 may be released into the atmosphere via exhaust conduit 35.

Depending on operating conditions, a portion of exhaust may be recirculated from the exhaust manifold 36, upstream of turbine 16, to intake manifold 22, downstream of compressor 14 via EGR passage 51, through EGR cooler 50 and EGR valve 52. In this manner, high pressure exhaust gas recirculation (HP-EGR) may be enabled. HP-EGR operation is discussed in greater detail herein. It will be appreciated that the EGR cooler 50 may be omitted from the engine system 100, in other examples. The EGR passage 51 includes an inlet 71 positioned downstream of the cylinders 30 and upstream of the turbine 16. Specifically, the inlet 71 opens into the exhaust manifold 36. However, other suitable inlet locations have been contemplated. For instance, the inlet 71 may open into an exhaust conduit upstream of the turbine 16. The EGR passage 51 further includes an outlet 72 positioned downstream of the throttle 20 and compressor 14. Specifically, in the depicted example the outlet 72 opens into the intake manifold 22. However, other outlet positions have been contemplated. For instance, the outlet 72 may open into an intake conduit downstream of the compressor 14 and/or throttle 20.

In some examples, in addition to the HP-EGR, low pressure exhaust gas recirculation (LP-EGR) may also be enabled wherein a portion of treated exhaust is recirculated from the exhaust conduit 35, downstream of turbine 16, to intake passage 42 upstream of compressor 14 via a low pressure EGR passage and therein coupled EGR cooler and EGR valve (not shown). EGR valve 52 may be opened to admit a controlled amount of cooled exhaust gas to an intake passage upstream of the compressor. The relatively long EGR flow path in engine system 10 provides homogenization of the exhaust gas into the intake air charge. Further, the disposition of EGR take-off and mixing points provides effective cooling of the exhaust gas for increased available EGR mass and improved performance.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced. It will be appreciated that the above combustion cycles is exemplary and other types of combustion cycles in the engine have been contemplated.

A controller 150 may be included in the vehicle 102. The controller 150 may be configured to receive signals from sensors in the vehicle as well as send command signals to components. Various components in the vehicle 102, engine system 100, and the engine 10 may be controlled at least partially by a control system (e.g., electronic control system) including the controller 150 and by input from a vehicle operator 152 via an input device 154. In this example, input device 154 includes an accelerator pedal and a pedal position sensor 156 for generating a proportional pedal position signal PP. The controller 150 is shown in FIG. 1 as a microcomputer, including processor 157 (e.g., microprocessor unit), input/output ports 158, an electronic storage medium for executable programs and calibration values shown as read only memory 160 (e.g., read only memory chip) in this particular example, random access memory 162, keep alive memory 164, and a data bus. Storage medium read-only memory 160 can be programmed with computer readable data representing instructions executable by processor 157 for performing the methods described below as well as other variants that are anticipated but not specifically listed. The controller 150 is configured to send a signal to the throttle 20. The controller 150 is also configured to send a signal to the turbine vane actuator 62, the fuel injector 66, and the EGR valve 52. Thus, the controller may send a signal to the EGR valve to adjust (e.g., increased or decrease) the amount of EGR gas flowing through the EGR passage 51. Thus, the controller 150 is configured to adjust an amount of fuel injected into the cylinders 30. In this way, an amount of metered fuel may be provided to the cylinders 30. The controller 150 may also receive signals from the MAP sensor 24, a mass airflow sensor (MAF) 25 positioned upstream of the compressor 14, a pressure sensor 126 positioned in the exhaust manifold, an exhaust gas composition sensor 128 positioned downstream of the emission control device, and/or a temperature sensor 129 coupled to the engine.

FIG. 1 also shows electronic control system 170, which may be any electronic control system of the vehicle in which engine system 100 is installed. The electronic control system may be configured to command the opening and closing of the vanes 60 in the turbine 16, command opening and closing of the EGR valve 52, and command adjustment of the throttle 20. In some examples, the commands may be generated and/or sent via the controller 150. The electronic control system may also be configured to command the opening, closure and/or adjustment of various electronically actuated valves in the engine system such as fuel delivery system valves, for example as needed to enact any of the control functions described herein. Further, to assess operating conditions in connection with the control functions of the engine system, the electronic control system may be operatively coupled to a plurality of sensors arranged throughout the engine system flow sensors, temperature sensors, pedal-position sensors, pressure sensors, etc.

The electronic control system 170 may be configured to move the plurality of vanes 60 in the turbine 16 into a closed (e.g. fully or partially closed) position in response to tip-out. It will be appreciated that tip-out may be initiated when a driver requested torque is discontinued. Thus, engine braking may be implemented via the turbine during certain operating conditions. It will be appreciated that engine braking may also be implemented in response to a driver brake request. The driver brake request may be generated in response to driver interaction with a brake pedal and/or driver selectable switch, for example. The control system may further be configured to after (e.g., only after) moving a plurality of vanes in a turbine of a turbocharger toward the closed position, move an EGR valve from a fully closed position towards an open (e.g., fully or partially open) position in response to tip-in. Adjusting the EGR valve in this way may increase the likelihood of the turbine vanes becoming unstuck from a stuck position by relieving pressure build at an inlet of the turbine, thereby improving turbocharger operation. Additionally, the likelihood of damage to the turbine and engine caused by an over-pressure condition is decreased when the EGR valve is operated in this way. The control system may further be configured to adjust the plurality of vanes based on driver-requested torque after (e.g., only after) the EGR is opened.

In one example, tip-out may be throttle tip-out where a driver has discontinued a torque request and the throttle is moved into a closed (e.g., fully closed or partially closed) position from an open position. It will be appreciated that throttle tip-out may be implemented in a spark ignition engine. Additionally or alternatively, tip-out may include discontinuing fuel injection in the engine, in one example. In the case of a compression ignition engine, tip-out may include discontinuing fuel injection and may not include throttle adjustment. Further in one example, tip-in may be a throttle tip-in where the throttle is opened from a closed positioned and adjusted to maintain stoichiometry. Additionally or alternatively, tip-in may include restarting fuel injection in the engine. In the case of a compression ignition engine, tip-in may include restarting fuel injection and may not include throttle adjustment. As described above, FIG. 1 shows a non-limiting example of an internal combustion engine. It should be understood that in some examples, the engine may have more or less combustion cylinders, control valves, throttles, and compression devices, among others. Example engines may have cylinders arranged in a "V" configuration, a horizontally opposed configuration, etc.

Figure 2:
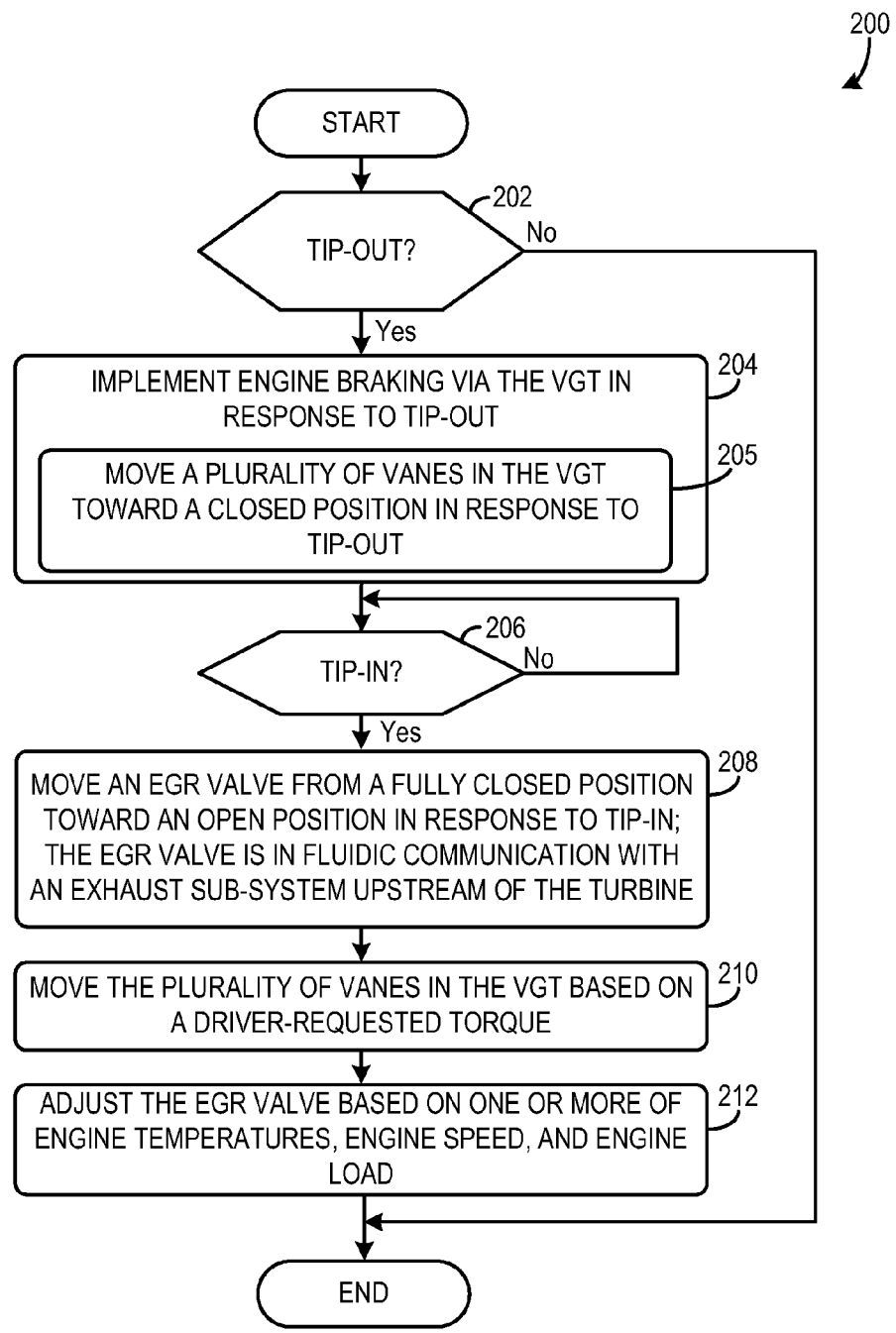
FIG. 2 shows a method for operating an engine system having a variable geometry turbocharger.

FIG. 2 shows a method 200 for operating an engine system. The method 200 may be implemented via the engine system discussed above with regard to FIG. 1 or may be implemented via other suitable engine systems. Specifically, the method 200 may be implemented via a control system, such as control system 170, shown in FIG. 1, or other suitable engine control systems.

At 202 the method includes determining if a tip-out is being implemented. It will be appreciated that tip-out may include discontinuing throttle adjustment and/or decreasing fuel injection in the engine. It will be appreciated that a tip-out request may be sent to the engine system (e.g., the control system) when a driver has discontinued a torque request via an input device such as an acceleration pedal and/or closed loop vehicle speed control.

If tip-out is not being implemented (NO at 202) the method ends. However, in other cases the method may return to 202 if tip-out is not being implemented. If a tip-out is being implemented (YES at 202) the method advances to 204. At 204 the method includes implementing engine braking via the VGT in response to tip-out. Implementing engine braking via the VGT in response to tip-out may include at 205 moving a plurality of vanes in the VGT toward a closed position in response to tip-out. In this way, engine braking via the VGT may be implemented. Further in some examples, it may be determined if engine braking should be implemented prior to step 204. Various parameters may be taken into account when making this determination, such as engine temperatures, vehicle braking requests, vehicle speed, etc.

At 206 the method includes determining if tip-in is being implemented. In one example, tip-in may be initiated responsive to a driver torque request generated via an input device (e.g., acceleration pedal). If it is determined that tip-in is not being implemented (NO at 206) the method returns to 206. However, in other examples the method may end if tip-in is not being implemented. If tip-in is being implemented (YES at 206) the method advances to 208. At 208 the method includes moving an EGR valve from a fully closed position toward an open position (e.g., fully open position or partially open position) in response to tip-in; the EGR valve is in fluidic communication with an exhaust sub-system upstream of the turbine. In this way, a pressure build up at the inlet of the turbine caused by stuck turbine vanes may be relieved, reducing the aerodynamic loading, thereby increasing the likelihood of the turbine vanes becoming unstuck. As a result, the operation of the turbine may be improved.

Next at 210 the method includes moving the plurality of vanes in the VGT based on a driver-requested torque. In one example, moving the plurality of vanes in the VGT based on a driver-requested torque includes implementing closed loop control of the intake manifold absolute pressure based on engine speed, engine load, and/or engine temperatures. Thus in one example, the plurality of vanes in the VGT may also be moved based on one or more of engine temperatures and engine speed. Still further in one example, the plurality of vanes in the VGT may be moved based on one or more of driver-requested torque, engine temperatures, and engine speed. At 212 the method includes adjusting the EGR valve based on one or more of engine temperatures, engine speed, and engine load.

Figure 3:
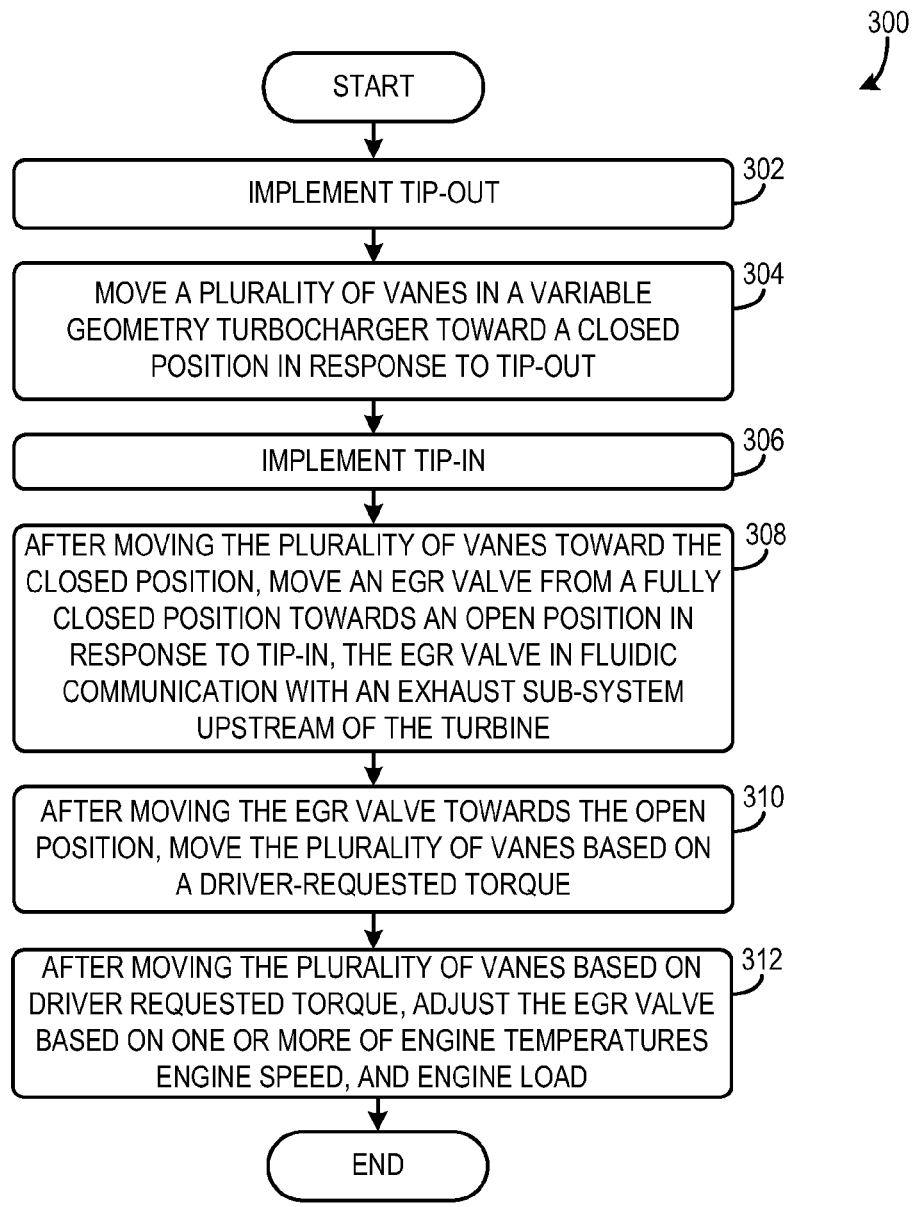
FIG. 3 shows a method for operation of an engine system having a variable geometry turbocharger.

FIG. 3 shows a method 300 for operating an engine system. The method may be implemented via the engine system discussed above with regard to FIG. 1 or may be implemented via other suitable engine systems. Specifically, the method 300 may be implemented via a control system, such as control system 170, shown in FIG. 1, or other suitable engine control systems.

At 302 the method includes implementing tip-out. Implementing tip-out may include moving a throttle plate in a throttle into a fully closed position from an open position. It will be appreciated that the throttle may have a plurality of degrees of opening and therefore a plurality of open positions. Implementing tip-out may additionally or alternatively include shutting off fuel delivery to the cylinder in the case of a compression ignition engine.

Next at 304 the method includes moving a plurality of vanes in a variable geometry turbocharger toward a closed position in response to tip-out. In one example, the vanes are in a turbine of the variable geometry turbocharger. In one example, the closed position of the plurality of vanes is a configuration of the vanes in the turbine where gas flow is substantially inhibited through the turbine. Further in one example, the step of moving the plurality of vanes of the variable geometry turbocharger is implemented when a request for acceleration from an input device is discontinued.

At 306 the method includes implementing tip-in. Implementing tip-in may include moving a throttle plate in a throttle into an open position from a fully closed position. Therefore in one example, tip-in includes opening a throttle valve in an intake sub-system of the engine and tip-out includes closing the throttle valve. Specifically in one example, tip-in includes movement of a throttle plate in a throttle from a closed position towards an open position and tip-out includes movement of a throttle plate in the throttle from an open position towards a closed position. It will be appreciated, that throttle movement during tip-in and tip-out may be implemented in a spark ignition engine. In the case of a compression ignition engine, a tip-out may include stopping fuel delivery to the cylinder(s) and a tip-in may include restarting fuel delivery to the cylinder(s).

At 308 the method includes after (e.g., only after) moving the plurality of vanes toward the closed position, moving an EGR valve from a fully closed position towards an open position in response to tip-in, the EGR valve in fluidic communication with an exhaust sub-system upstream of the turbine. In one example, the EGR valve is in fluidic communication with an intake manifold downstream of a compressor in the turbocharger. In this way, a pressure build at an inlet of the turbine caused by stuck vanes may be alleviated by reducing the aerodynamic loading on the vanes. By reducing the pressure at the turbine inlet the likelihood of the vanes becoming unstuck increases. As a result, turbocharger operation may be improved.

Next at 310 the method includes after (e.g., only after) moving the EGR valve towards the open position, move the plurality of vanes based on a driver-requested torque. For example, moving the plurality of vanes based on driver requested torque includes implementing closed loop intake manifold absolute pressure (MAP) control depending on one or more of engine temperatures, engine speed, and engine load. At 312 the method includes after (e.g., only after) moving the plurality of vanes based on driver requested torque, adjusting the EGR valve based on one or more of engine temperature, engine speed, and engine load.

Figure 4:
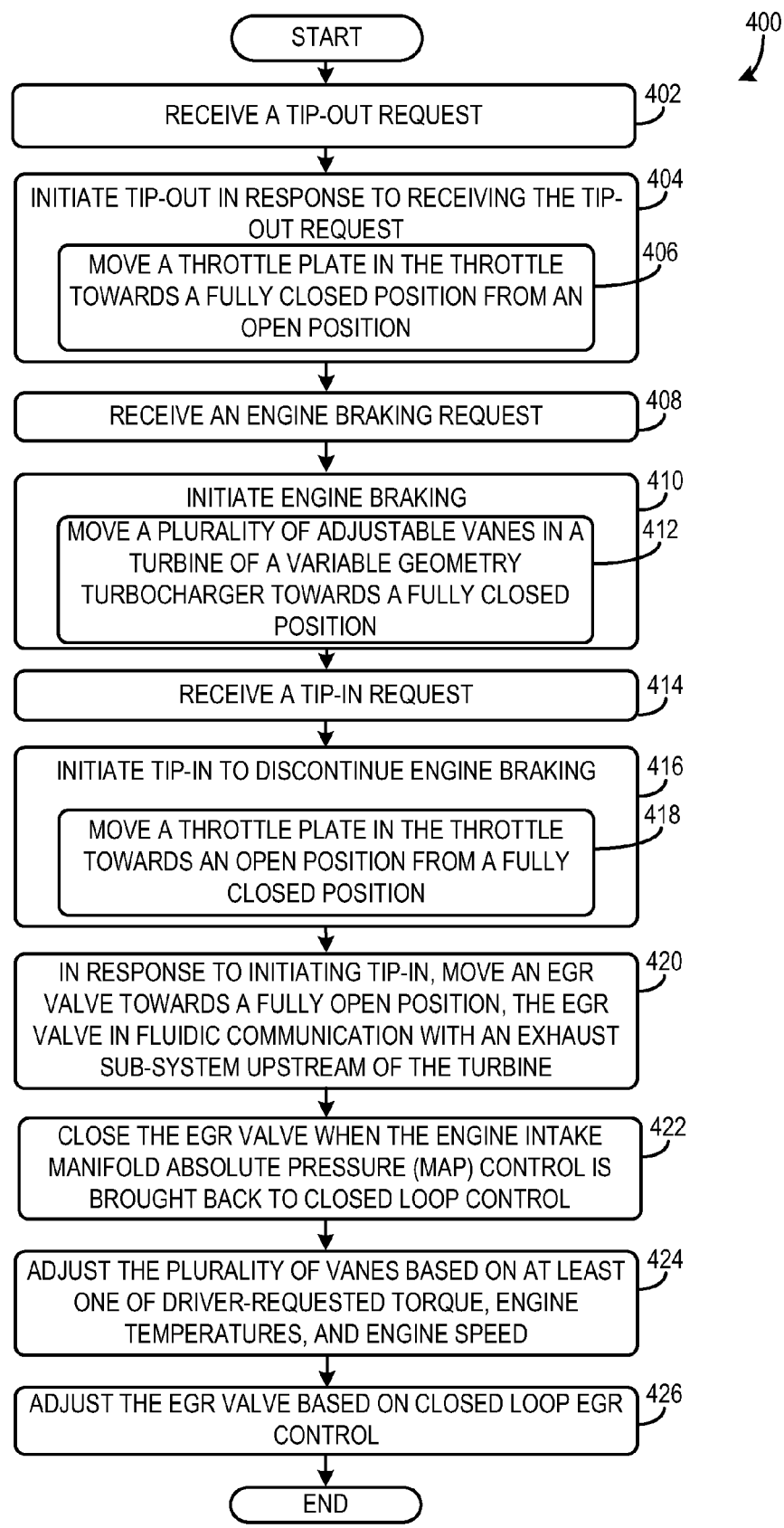
FIG. 4 shows another method for operation of an engine system having a variable geometry turbocharger.

FIG. 4 shows a method 400 for operating an engine system. The method 400 may be implemented via the engine system discussed above with regard to FIG. 1 or may be implemented via other suitable engine systems. Specifically, the method 400 may be implemented via a control system, such as control system 170, shown in FIG. 1, or other suitable engine control systems.

At 402 the method includes receiving a tip-out request. The tip-out request may be generated and sent to a control system in response to a driver discontinuing a torque request via an input device such as an accelerator pedal and/or vehicle closed loop speed control. It will be appreciated that tip-out request may be generated in response to driver input from an acceleration pedal and/or vehicle closed loop speed control. Specifically, the driver may discontinue a torque request via the acceleration pedal to initiate a tip-out, or the vehicle closed loop speed control may request no torque.

At 404 the method includes initiating tip-out in response to receiving the tip-out request. Initiating tip-out may include at 406 moving a throttle plate in the throttle towards a fully closed position from an open position. Alternatively, in the case of compression ignition tip-out may include shutting off cylinder fuel delivery.

Next at 408 the method includes receiving an engine braking request. At 410 the method includes initiating engine braking Initiating engine braking may include at 412 moving a plurality of adjustable vanes in a turbine of a variable geometry turbocharger towards a closed position. Additionally, initiating engine braking may also include moving the throttle into a closed position and/or shutting off fuel delivery to the cylinder.

At 414 the method includes receiving a tip-in request. In one example, tip-in includes moving a throttle in the intake sub-system into an open position from a closed position. Alternatively, in the case of compression ignition fuel delivery to the cylinder will restart when tip-in is initiated. Further in one example, the tip-in is driver requested.

At 416 the method includes initiating tip-in to discontinue engine braking Thus it be appreciated that engine braking may be discontinued in response to initiating tip-in. Initiating tip-in may include at 418 moving a throttle plate in the throttle towards an open position from a fully closed position. Alternatively in the case of compression ignition tip-in may include restarting fuel delivery to the cylinder. Next at 420 the method includes in response to initiating tip-in move an EGR valve towards an open position, the EGR valve in fluidic communication with an exhaust sub-system upstream of the turbine.

At 422 the method includes closing the EGR valve when the engine intake manifold absolute pressure (MAP) control is brought back to closed loop control. Next at 424 the method includes adjusting the plurality of vanes based on at least one of driver-requested torque, engine temperatures, and engine speed. At 426 the method may include adjusting the EGR valve based on closed loop EGR control.

FIG. 5 shows a graph 500 illustrating movement of the accelerator pedal, VGT, and an EGR valve vs time. It will be appreciated that the acceleration pedal, VGT, and EGR valve may be the input device 154, turbine 16, and EGR valve 52 shown in FIG. 1, in one example. However in other examples, other suitable input devices, VGTs, and EGR valves may be utilized. Additionally, it will be appreciated that the graph 500 may be associated with the methods disclosed in one or more of FIGS. 2-4.

As shown, the acceleration pedal is released thereby initiating tip-out. Tip-out may trigger suspension of fuel injection in the engine and/or throttle adjustment in the engine. Therefore, the engine speed correspondingly decreases. Specifically, the engine speed decreases to 0 revolutions per minute (RPM). In this way, the engine is spun down.

Additionally, in response to tip-out the VGT is closed. Specifically, vanes in the VGT may be moved toward a closed (e.g., fully closed) position. In this way, engine braking may be implemented by the VGT. Further in response to tip-out the EGR valve may be closed. However, in other examples the EGR valve may be closed prior to tip-out. It will be appreciated that closing the EGR valve may include inhibiting EGR gas flow through the EGR valve.

After the engine is at rest for a period of time the acceleration pedal is depressed initiating tip-in. Tip-in triggers a recommencement of fuel injection in the engine and throttle adjustment in the case of a spark ignition engine. The engine speed increases from a base value of 0 RPM after tip-in.

The EGR valve is opened in response to tip-in. After a time ($\delta$) the VGT is opened. Thus, the VGT may be opened in response to opening the EGR valve. Opening the EGR valve decreases pressure on the VGT vanes. Consequently, the likelihood of the turbine vanes becoming stuck is decreased, thereby improving engine operation.

The magnitude of $\delta$ may be varied by the control system based on a number of engine operating conditions such as boost pressure, engine speed, pedal position, manifold air pressure, engine temperature, ambient temperature, etc. For instance, the control system may increase $\delta$ in response to an increase in engine speed, in one example. Conversely, $\delta$ may decrease in response to a decrease in engine speed. In an additional example, $\delta$ may increase in response to an increase in manifold absolute pressure (MAP). On the other hand, $\delta$ may decrease in response to a decrease in MAP. Further each of these various adjustment may all be used together and concurrently so that as operating conditions such as engine speed and MAP change concurrently, the delay may be varied accordingly. For example, as engine speed increases and MAP increases concurrently, $\delta$ may be increased, although by a greater amount than if only one of MAP and engine speed were increasing.

Note that the graphs of FIG. 5 shows various operation occurring along the same timeline, and thus occurring during the same operating conditions at a given time. Further, the graphs show how the parameters are maintained (e.g., not changed) by the horizontal flat lines with time.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine system, comprising:
adjusting a plurality of vanes in a variable geometry turbocharger toward a closed position responsive to a pedal tip-out:
adjusting an EGR valve from a fully closed position toward an open position responsive to a pedal tip-in, the EGR valve in fluidic communication with an exhaust sub-system upstream of a turbine;
determining a delay based on an engine operating condition; and
after the EGR valve is adjusted, waiting the determined delay before opening the plurality of vanes and then determining a driver-request torque and adjusting the plurality of vanes based on the driver-request torque;
via a controller having non-transitory computer-readable storage medium.

2. The method of claim 1, wherein the delay is determined based on engine speed.

3. The method of claim 2, where the closed position of the plurality of vanes is a configuration of the vanes in the turbine where gas flow is substantially inhibited through the turbine.

4. The method of claim 1, where the pedal tip-in includes opening a throttle valve in an intake sub-system of the engine and the pedal tip-out includes closing the throttle valve, and wherein the delay is determined to be increased at increased engine speeds, and decreased at decreased engine speeds.

5. The method of claim 1, further comprising after moving the plurality of vanes based on driver requested torque, adjusting the EGR valve based on one or more of engine temperatures, engine speed, and engine load.

6. The method of claim 1, where the step of adjusting the plurality of vanes of the variable geometry turbocharger is implemented when a request for acceleration from an input device is discontinued.

7. The method of claim 1, where adjusting the plurality of vanes based on driver requested torque includes implementing closed loop control of an intake manifold absolute pressure based on engine speed, engine load, and engine temperatures.

8. The method of claim 1, where the EGR valve is in fluidic communication with an intake manifold downstream of a compressor in the turbocharger.

9. An engine system comprising:
a variable geometry turbocharger including a compressor positioned in an intake sub-system in fluidic communication with an engine and a turbine positioned in an exhaust sub-system in fluidic communication with the engine, the turbine including a plurality of vanes;
an EGR valve in fluidic communication with the exhaust sub-system upstream of the turbine and the intake sub-system;
a throttle positioned in the intake sub-system downstream of the compressor; and
a control system having a non-transitory computer readable storage medium with instructions to, after moving the plurality of vanes in the turbine of the turbocharger toward a closed position, move the EGR valve from a fully closed position towards an open position in response to tip-in, determine a delay based on engine speed, and then after moving the EGR valve, opening the plurality of vanes from the closed position, the medium further including instructions to determine a magnitude of the delay based on engine speed, wherein the plurality of vanes is opened after the determined delay from when the EGR valve is moved from the fully closed position.

10. The engine system of claim 9, where the turbine does not include a wastegate.

11. The engine system of claim 9, where the EGR valve is in fluidic communication with the intake sub-system downstream of the compressor.

12. The engine system of claim 9, where the positions of the plurality of vanes increase and decrease an exhaust turbine inlet pressure.

13. The engine system of claim 9, where the engine utilizes a diesel fuel.

14. The engine system of claim 9, where the vanes in the variable geometry turbocharger are controlled via an electronic actuation device or a hydraulic engine oil actuation device controlled with an electronic control valve.

15. A method for operating an engine system, comprising:
initiating engine braking by adjusting a plurality of adjustable vanes in a turbine of a variable geometry turbocharger towards a closed position;
determining initiation of a pedal tip-in to discontinue engine braking; and
in response to initiation of the pedal tip-in, adjusting an exhaust gas recirculation (EGR) valve towards an open position from a fully closed position before adjusting the vanes from the closed position toward an open position, the EGR valve in fluidic communication with an exhaust sub-system upstream of the turbine,
wherein the vanes are adjusted after a delay from the adjusting of the EGR valve from the fully closed position toward the open position, the delay determined based on engine speed and manifold pressure, where the delay is increased in response to an increased engine speed, wherein as engine speed increases and manifold pressure increases concurrently, the delay is increased, although by a greater amount than if only one of manifold pressure and engine speed were increasing;
via a controller having non-transitory computer-readable storage medium.

16. The method of claim 15, further comprising closing the EGR valve when engine intake manifold absolute pressure (MAP) control is brought back to closed loop control.

17. The method of claim 15, where the pedal tip-in includes moving a throttle in an intake sub-system into an open position from a closed position or restarting fuel delivery to a cylinder.

18. The method of claim 15, where the pedal tip-in is driver requested.

19. The method of claim 15, further comprising adjusting the plurality of vanes based on at least one of driver-requested torque and closed loop engine intake manifold absolute pressure control (MAP).

20. The method of claim 15, where initiating engine braking further includes moving a throttle into a closed position or shutting off fuel delivery to a cylinder.

* * * * *